(12) United States Patent
Bowman (10) Patent No.: US 6,260,225 B1
(45) Date of Patent: Jul. 17, 2001

(54) TIRE COATING APPARATUS

(76) Inventor: Bradford K. Bowman, 4889 Destination Ct., Unit No. 206, West Chester, OH (US) 45069

( * ) Notice: Subject to any disclaimer, the term of this patent is extended or adjusted under 35 U.S.C. 154(b) by 0 days.

(21) Appl. No.: 09/512,848

(22) Filed: Feb. 25, 2000

(51) Int. Cl.$^7$ ...................................................... B05C 1/02
(52) U.S. Cl. .................... 15/53.4; 15/97.3; 15/DIG. 2; 118/684; 118/244; 118/255; 118/258; 118/264; 118/304
(58) Field of Search ........................... 15/53.4, 53.1–53.3, 15/97.3, DIG. 2; 134/123; 118/684, 258, 264, 302, 304, 222, 244, 255

(56) References Cited

U.S. PATENT DOCUMENTS

| | | | |
|---|---|---|---|
| 3,208,089 | * 9/1965 | Vani | 15/53.4 |
| 3,305,886 | * 2/1967 | Fricke | 15/53.4 |
| 3,345,666 | 10/1967 | Hanna et al. | 15/21 |
| 3,346,895 | 10/1967 | Consolo | 15/21 |
| 3,403,417 | 10/1968 | Hanna et al. | 15/21 |
| 3,628,212 | 12/1971 | Van Brakel | 15/21 B |
| 3,822,431 | 7/1974 | Van Brakel | 15/21 D |
| 4,020,518 | 5/1977 | Harding et al. | 15/53 B |
| 4,312,090 | * 1/1982 | Durcan | 15/53.2 |
| 4,694,523 | 9/1987 | Van Brakel | 15/53 B |
| 4,985,957 | 1/1991 | Belanger et al. | 15/53.3 |
| 5,052,629 | 10/1991 | Belanger et al. | 239/752 |
| 5,123,136 | 6/1992 | Belanger et al. | 15/53.4 |
| 5,125,981 | 6/1992 | Belanger et al. | 134/18 |
| 5,134,742 | * 8/1992 | Ennis | 15/DIG. 2 |
| 5,463,788 | * 11/1995 | Ennis | 15/53.2 |

* cited by examiner

Primary Examiner—Laura Edwards
(74) Attorney, Agent, or Firm—Wood, Herron & Evans, L.L.P.

(57) ABSTRACT

A tire coating machine for applying a coating to a vehicle tire. The machine includes a brush and a positioner for supporting the brush and moving the brush into contact with the tire. A first fluid path is connected to a source of a first fluid and directs the first fluid to the brush, and a second fluid path is connected to a source of a second fluid and directs the second fluid to the brush. The brush transfers at least the second fluid to the tire. The first and second fluids are water and a coating solution, respectively.

23 Claims, 5 Drawing Sheets

TIRE COATING APPARATUS

FIELD OF THE INVENTION

This invention relates generally to the field of vehicle cleaning machines and more particularly, to an apparatus and method for coating tires.

BACKGROUND OF THE INVENTION

Vehicle washing services have been known for decades. Generally, such washing services utilize automated washing machines that are designed to wash particular portions of the vehicles. For example, vertical surfaces of the vehicle body are normally washed using a relatively large and long brush rotating about a generally vertical axis that washes those surfaces as the vehicle moves through the washing station. The vehicle is either driven or conveyed through the washing station.

Other special washing machines are designed to clean the vehicle's tires as it moves through the washing station. Such tire washing machines often use a long brush that is rotating with respect to a horizontal axis and is moved into contact with the vehicle tires by a cylinder or other means. Washing and rinsing fluids are sprayed through a common nozzle onto the tire, the rotating brush or both. While such machines are effective at removing dirt from the tires, after the wash, the tires are generally a flat color that is not visually attractive. Further, the nature of the tire material causes them to again quickly collect dirt and look even less attractive.

For many years, there have been commercially available coatings that are manually applied to vehicle tires to substantially improve their appearance and make them more dirt resistant. In the environment of a full service vehicle cleaning business, the requirement of having to manually apply the coating is labor intensive, expensive and adds valuable time to a vehicle cleaning cycle. Further, manually applied coatings may be inconsistently applied especially at the area where the tire meets the ground. Thus, there is a need for an apparatus and method for automatically applying such a coating to tires after they have been cleaned.

SUMMARY OF THE INVENTION

The present invention provides a tire coating apparatus that automatically applies a consistent, high quality tire coating to the tires of a vehicle. The tire coating apparatus of the present invention produces coated tires that are very pleasing in appearance, and coated tires normally look cleaner longer than uncoated tires. Further, the coating provides some protection for the tires against the harmful effects of ultraviolet light. The tire coating apparatus of the present invention is especially useful in combination with facilities that have automatic vehicle cleaning machines. Thus, the tire coating machine of the present invention is efficient and economical to install and use.

In accordance with the principles of the present invention and in accordance with the described embodiments, the present invention provides a tire coating machine for applying a coating to a vehicle tire. The machine includes a brush and a positioner for supporting the brush and moving the brush into contact with the tire. A first fluid path is connected to a source of a first fluid and directs the first fluid to the brush, and a second fluid path is connected to a source of a second fluid and directs the second fluid to the brush. The first and second fluids saturate the brush, and the brush transfers at least the second fluid to the tire.

In one aspect of the invention, the first fluid is water; and the second fluid is a tire coating fluid, for example, a silicone-type tire coating. In another aspect of the invention, the first and second fluid paths include respective first and second nozzles for first wetting the brush with water and thereafter wetting the brush with the coating solution.

The coating machine of the present invention has the advantages of utilizing minimal floor space, requiring no manual labor and providing a consistent coating in a minimal amount of time.

A second embodiment of the invention provides a method of executing a tire coating operation comprising applying during a first period of time a first fluid to a brush, applying during a subsequent, second period of time a second fluid to the brush, and thereafter moving the brush into contact with the tire to apply at least the second fluid to the tire. In one aspect of this second embodiment, the first fluid is water and the second fluid is a tire coating fluid.

These and other objects and advantages of the present invention will become more readily apparent during the following detailed description together with the drawings herein.

DETAILED DESCRIPTION OF THE INVENTION

Figure 1:
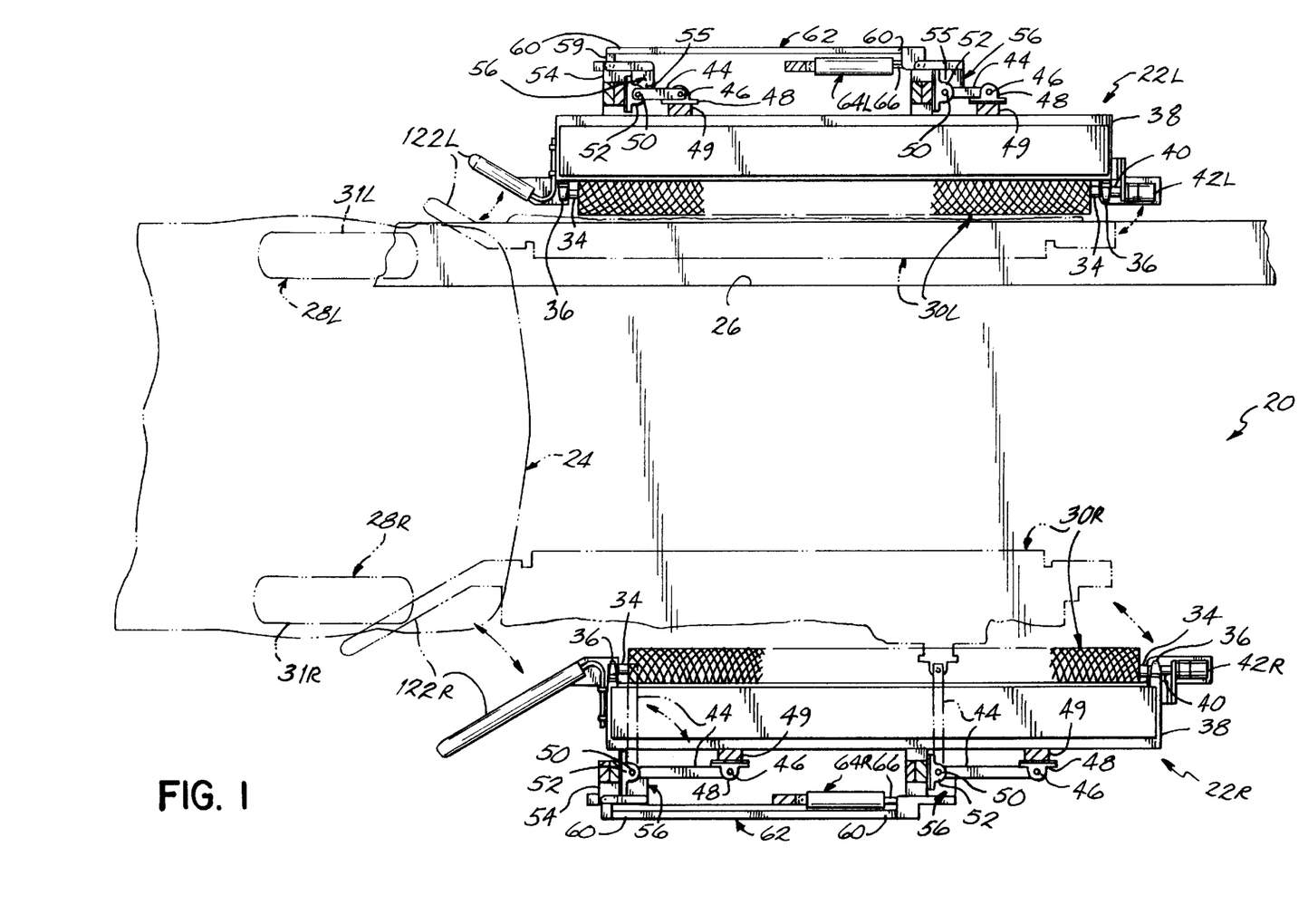
FIG. 1 is a schematic top view of a tire coating apparatus in accordance with the principles of the present invention.

Referring to FIG. 1, a tire coating station 20 includes left and right tire coating applicators or machines, 22L and 22R, respectively. The tire coating apparatus 20 is normally located as a part of a vehicle cleaning establishment in which a vehicle 24 is moved through the cleaning establishment by means of a conveyor 26 in a known manner. Typically, a roller (not shown), which is attached to an endless chain-loop conveyor 26, engages the left rear tire (not shown) to move the vehicle 24 with the conveyor 26. The tire coating apparatus 20 is often the final station at the end of the automated vehicle cleaning line, and the tires 28L, 28R are washed or otherwise cleaned at an upstream station. As the vehicle 24 approaches the coating apparatus 20, rotating left and right brushes 30L, 30R, respectively, are moved to the location shown in phantom and into contact with the tires 28L, 28R. As the tires 28L, 28R move along the brushes 30L, 30R, a protective tire coating or dressing fluid is applied by the brushes 30L, 30R to the outer directed surfaces 31L, 31R of the tires 28L, 28R. After both the front and rear tires of the vehicle 24 have been coated, the rotating brushes 30L, 30R are retracted to their rest positions as illustrated in solid in FIG. 1.

Figure 2:
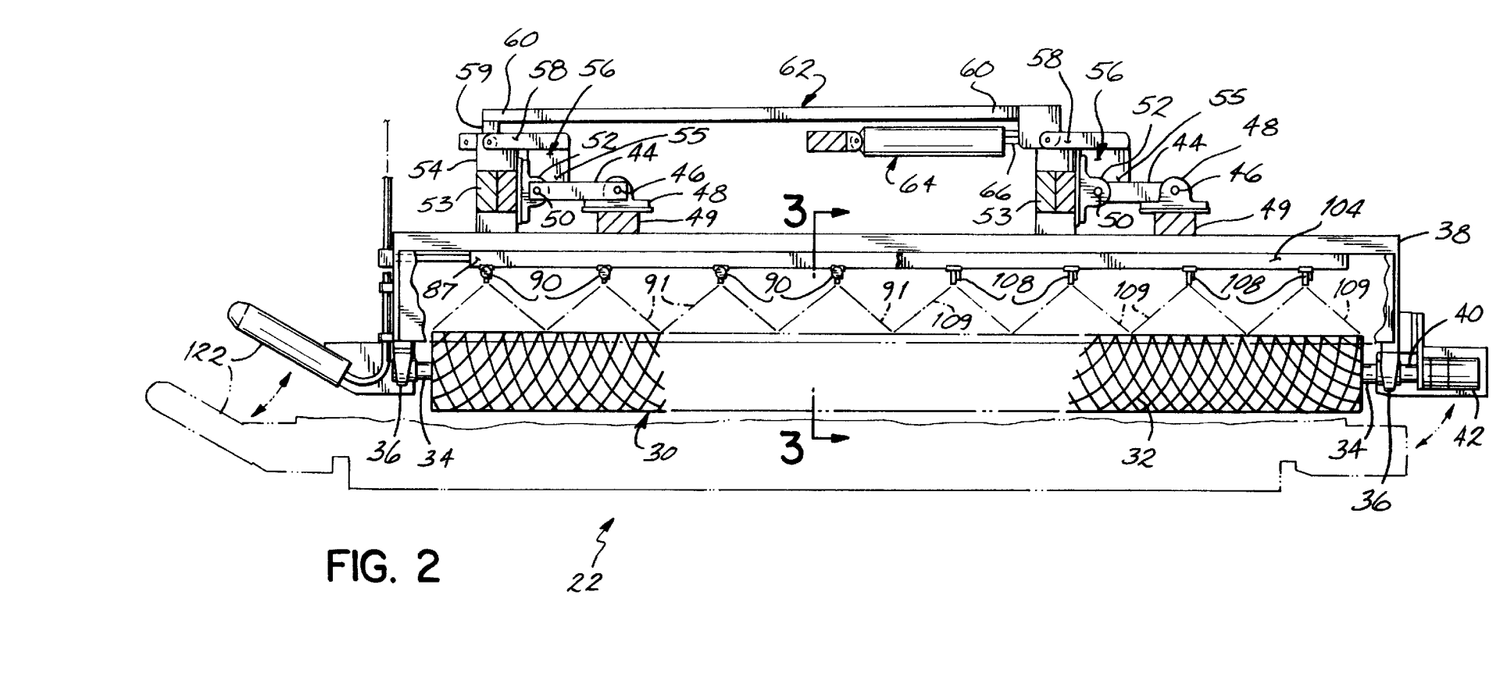
FIG. 2 is a detailed top view of a tire coating machine of the tire coating apparatus of FIG. 1.

The left and right tire coating machines 22L, 22R are substantially identical in construction; and therefore, only the left side coating machine 22L will be described in detail. Referring to FIG. 2, it is understood at all of the parts illustrated are found in both of the coating machines 22L and 22R of FIG. 1. The rotating brush 30 is comprised of a durable, absorbent, flexible brush material 32 that collectively defines a generally cylindrical shape. The ends of the center shaft 34 are mounted in bearing blocks 36 that, in turn, are fixed to a support or plate 38. One end of the shaft 34 is mechanically connected to an output shaft 40 of a brush motor 42 that rotates the brush 30 with respect to a longitudinal axis.

As will be appreciated, it is important that the application of the tire coating fluid to the tires of successive vehicles be of a consistent high quality. Often, some tires are dirtier than others, thereby leaving the tire coating brush 30 with some dirt after a tire coating application. Further, the tire coating fluid dries on the brush 30 between tire coating cycles, and the brush 30 becomes stiffer and is less effective as an applicator. Therefore, whether dirty or dry, it is necessary to properly condition the brush 30 between tire coating applications. In order to dissolve dried tire coating fluid and rinse the brush 30 of dirt before the next tire coating application, the brush 30 is first wetted with water before it is wetted with the tire coating fluid. The water is effective to dissolve the dried tire coating fluid and provide a minimal rinsing of the brush 30 prior to the next coating cycle. The wetting cycle costs money and takes time; and that must be balanced against the value received in terms of the quality of the resulting coating application. Thus, the extent to which the water wetting cycle used and the time required to wet the brush with the tire coating fluid is a matter of judgement with each coating apparatus installation.

Figure 3:
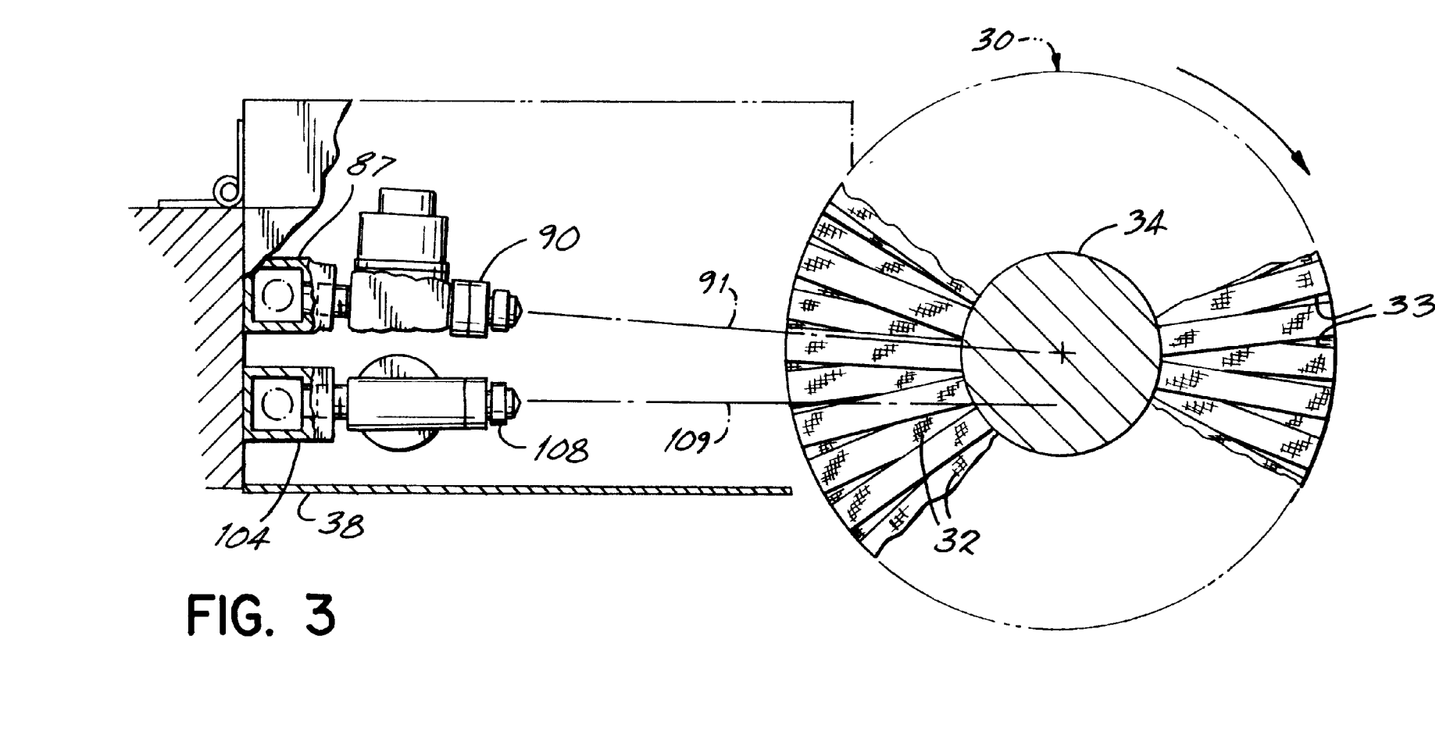
FIG. 3 is a cross-sectional view taken along line 3—3 of FIG. 2 and illustrates in detail the two nozzles of the tire coating apparatus.

The brush 30 is wetted with water by a first plurality of spray nozzles 90 that are fluidly connected to a manifold 87 supplying the water. Referring to FIG. 3, the manifold 87 is fixed to the plate 38 and the nozzles 90 are slightly angled downwardly, so that the nozzles 90 direct a spray of water 91 generally radially with respect to brush 30. The brush 30 is wetted with the tire coating fluid by a second plurality of spray nozzles 108 that are fluidly connected to a manifold 104 supplying the tire coating fluid. The manifold 104 is fixed to the support 38 so that the nozzles 108 direct a spray of tire coating fluid 109 generally radially with respect to the brush 30. The plurality of water nozzles 90 are equally spaced approximately one foot apart over the full length of the eight foot brush 30, and a coating fluid nozzle 108 is located immediately adjacent to, and below, each of the water nozzles 90. In FIG. 2, the manifold 87 is broken at the midpoint of the brush 30 so that the arrangement of the nozzles 108 can be shown below the nozzles 90. Thus, for an eight foot brush 30, there are eight water nozzles 90 and eight coating fluid nozzles 108.

The nozzles produce fan shaped sprays 91, 109, and any width of fan spray can be used. However, as will be appreciated, the wider the spray from the nozzles 90, 108, the closer the proximity of the nozzles to the brush 30 and the smaller the width of the support plate 38. A nozzle having a fan spray of 110° permits the nozzles 90, 108 to be placed only 4 inches from the brush 30. For most coating cycles, water nozzles 90 have a flow of 0.5 gallons per minute, and the coating fluid nozzles 108 have a flow of 0.1 gallons per minute are used.

FIG. 3 also provides a cross-section view of the brush 30. The rushes normally rotate in a direction such that they rotate toward the floor immediately after losing contact with the tire. The brush 30 is made from an absorbent durable material, for example, a polyester cloth, a foam or other absorbent durable material. As shown in FIG. 3, the brush 30 is made from a plurality of elongated rectangular polyester strips 33 that have their inner ends anchored to the center shaft 34. The polyester strips 33 are packed very tightly together in a generally spiral pattern over the length of the brush 30, so that the outer ends of the polyester strips 33 collectively provide a generally constant radius cylindrical shape for the brush 30. The compact construction of the brush 30 permits it to retain a sufficient amount of tire coating fluid so that it can apply a consistent coating of silicone to the tires over the full coating cycle. A brush of the construction described above is commercially available from Erie Brush Co. of Chicago, Ill.

Referring to FIG. 2, the support 38 on which the brush 30 is rotatably mounted, is connected to the distal ends of extension arms 44 by bearings 46, for example, ball bearings. The bearings 46 are mounted within bearing blocks 48 that, in turn, are rigidly connected to respective vertical posts 49. The vertical posts 49 are rigidly connected to the support 38 at locations that distribute the weight of the brush assembly generally equally on the two extension arms 44. The vertical posts 49 also hold the plate 38 and brushes 30 at a desired elevation. The proximal ends of the two extension arms 44 are pivotally mounted by respective bearings 50 to respective bearing blocks 52. The bearing blocks 52 are rigidly connected to respective vertical posts 53 that, in turn, are connected to a frame 54 that normally rests on, and is bolted or otherwise affixed to, a floor of the vehicle washing establishment. The proximal ends of the extension arms 44 are rigidly connected to the ends 55 of right angle pivot blocks 56. The opposite ends 58 of the pivot arms or blocks 56 are pivotally connected to link plates 59 which, in turn, are rigidly connected to opposite ends 60 of a tie bar 62.

A cylinder 64 has a cylinder rod 66, the distal end of which is ivotally connected to one of the link plates 59. Therefore, as the cylinder 64 oves its rod 66 to the right as viewed in FIG. 2, the link plate 59 and tie bar 62 also move to the right. That action of the tie bar 62 causes the pivot arms 56 and connected extension arms 44 to rotate clockwise, thereby moving the support 38 and rotating brush 30 inward toward the vehicle tires to the position shown in phantom in FIG. 2. Upon the cylinder 64 retracting its rod 66, the tie bar 62 moves to the left as illustrated in FIG. 2, thereby causing the pivot arms 56 and extension arms 44 to rotate counterclockwise and retract the rotating brush 30 to its rest position as illustrated in solid in FIG. 2.

Figure 4:
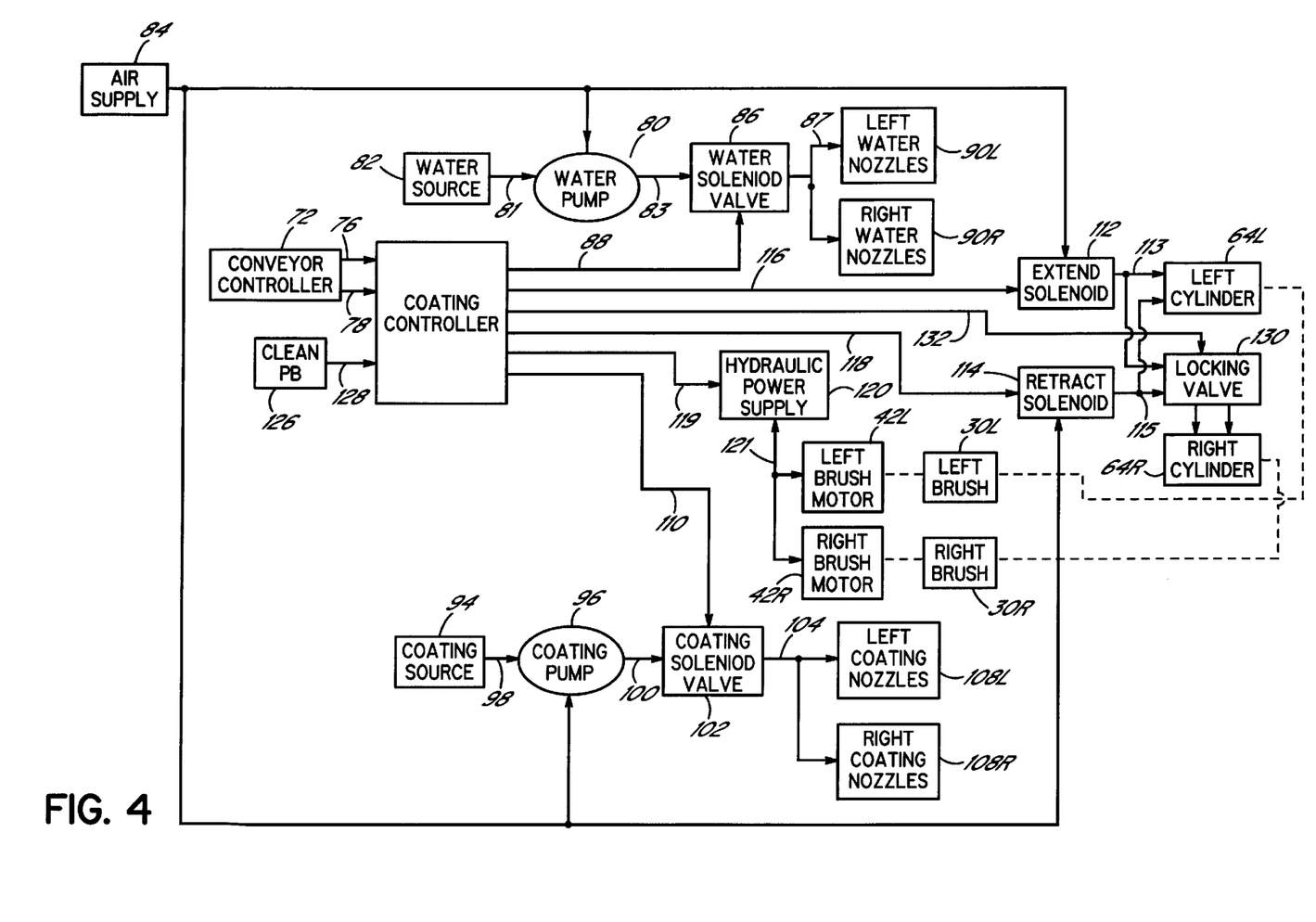
FIG. 4 is a schematic block diagram of a control system for the tire coating apparatus of FIG. 1.

The operation of the coating apparatus 20 of FIG. 1 is controlled by a coating controller 70 of FIG. 4. The coating controller 70 is electronically connected to a conveyor controller 72. The conveyor controller 72 receives inputs from various sensors positioned with respect to the conveyor line 26 so that the conveyor controller 72 is able to continuously track the location or position of the vehicle 24 with respect to the conveyor 26. The conveyor controller 72 also determines the length of the vehicle 24. The conveyor controller 72 provides output signals to the coating controller 70 by means of signal lines 76, 78 that represent, respectively, the length of the vehicle and the time at which a coating application cycle is to be initiated.

A first pump 80 has an input 81 fluidly connected to a source of a first fluid 82, for example, water. The fluid source 82 is normally a one gallon reservoir tank that is filled by the operation of a float valve. As will be appreciated, the water source 82 may be comprised of reservoirs or accumulators of other sizes or a direct connection to a regulated pressure water line. The pump 80 is powered by pressurized air from an air supply 84 and has an output 83 fluidly connected to a water solenoid valve 86. At appropriate times, the coating controller 70 (FIG. 4) provides a signal on output 88 to open the solenoid valve 86, thereby providing the first fluid or water by means of the fluid line/manifold 87 to the left and right water nozzles 90L, 90R, respectively.

The second fluid is a tire coating fluid that is contained in a coating fluid source 94. One tire coating fluid that may be used is a water-based silicone solution that is commercially available from Calvary Industries of Fairfield, Ohio. The coating fluid source may be a commercial container in which the tire coating fluid is commercially provided. A coating pump 96, similar to the first pump 80, is also powered by the air supply 84. The coating pump 96 has an input 98 fluidly connected to the coating fluid source 94 and an output 100 fluidly connected to a coating solenoid valve 102. The coating solenoid valve 102 is connected by the fluid line/manifold 104 to the respective left and right coating fluid nozzles 108L, 108R. At the appropriate times, the coating controller 70 provides a control signal over the output line 110 to open the coating solenoid valve, thereby providing the tire coating fluid to the nozzles 108L, 108R.

The left and right cylinders 64L, 64R are air/oil cylinders that are pneumatically powered by pressurized air from the air supply 84. The air supply 84 is fluidly connected to extend and retract solenoid valves 112, 114, respectively. The coating controller 70 at the appropriate times, provides output signals on control lines 116, 118 that open and close the extend and retract solenoid valves 112, 114, thereby connecting and disconnecting the cylinders 64L, 64R via fluid lines 113, 115 from the pressurized air of the air supply 84. Opening the extend solenoid valve 112 is effective to extend the brushes 30L, 30R outward into contact with the tires, and opening the retract solenoid valve 114 is effective to retract the brushes 30L, 30R to their rest position. At the appropriate times, the controller 70 provides a signal on output line 119 to turn on a hydraulic power supply 120, thereby providing pressurized hydraulic fluid through lines 121 to brush motors 42L, 42R and rotating the brushes 30L, 30R.

Figure 5:
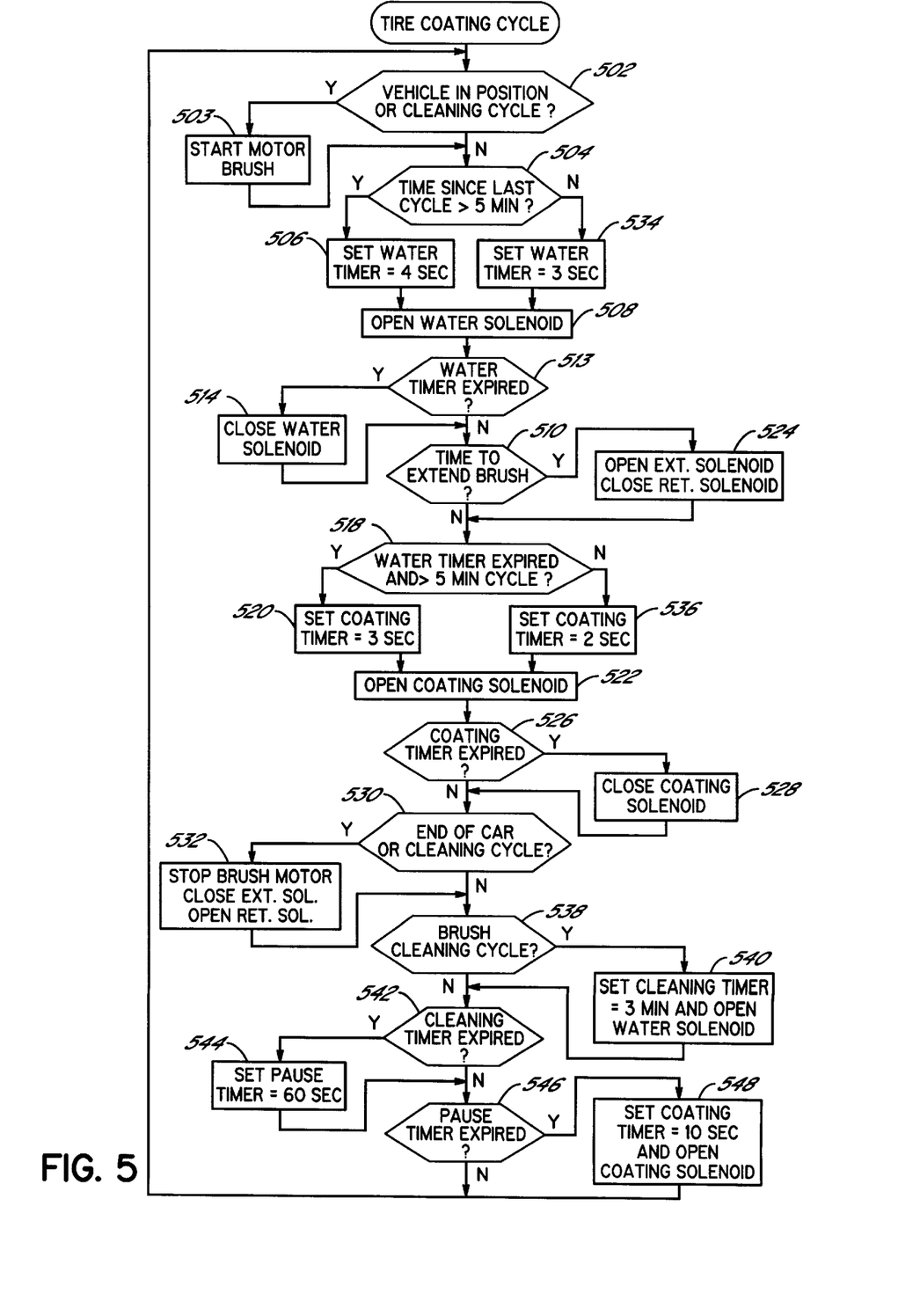
FIG. 5 is a flowchart illustrating one embodiment of a cycle executed by the control of FIG. 4 in operating the tire coating apparatus of FIG. 1.

In use, referring to FIGS. 1 and 4, the coating controller 70 provides output signals to operate the coating apparatus 22, thereby automatically and simultaneously applying the tire coating fluid to tires 28L, 28R of the vehicle 24 being conveyed by the conveyor 26 past the coating apparatus 20. The process executed by the coating controller 70 is schematically illustrated by the flowchart of FIG. 5. Upon power being applied to the coating controller 70, the process of FIG. 5 is continuously iterated. The controller 70 first determines, at 502, whether a vehicle has been conveyed to a cycle start position at which the coating cycle is to be initiated. That position is determined by the conveyor controller 72 which is tracking the vehicle as it moves along the conveyor 26 and is provided as a signal on output line 78 to the coating controller. In this application, the exact location of the cycle start position with respect to the coating apparatus 20 is determined by the longest coating cycle time.

For the most efficient and consistent application of a coating, the rotating brushes 30 should contact the tires 28 immediately after the tire coating fluid has been applied to the brush. The longest coating cycle requires four seconds to apply water to the rotating brushes and three seconds to apply the coating fluid to the brushes. Therefore, it requires seven seconds after the start of a coating cycle to wet the brushes with water and the tire coating fluid in order to apply a proper tire coating to the tires. Thus, with the present example, the conveyor controller provides a cycle start signal to the coating controller 70 when the conveyor controller 72 detects that the vehicle is seven seconds away from contact with the rotating brushes 30L, 30R. When the controller 70 receives a signal that the vehicle is at the cycle start position, the controller 70, at 503, provides a signal on output line 119 to turn on the hydraulic power supply 120 which, in turn, provides hydraulic fluid to the brush motors 42L, 42R, thereby causing the brushes 30L, 30R to rotate.

The controller 70 in FIG. 5 then determines, at 504, the elapsed time since the last coating cycle. If the elapsed time is greater than five minutes, at 506, a water timer within the controller 70 is set to four seconds; and the controller 70, at 508, provides a control signal over output line 88 to open the water solenoid valve 86. The controller then, at 513, determines whether the water timer has expired. If not, the controller 70, at 510, determines whether it is time to extend the rotating brushes 30L, 30R. The brushes require three seconds to extend which, in this example, is the same time required to wet the brushes 30L, 30R with the coating fluid. Therefore, in this example, nothing else happens until the water timer expires. The controller 70 then, at 514, provides a signal on output line 88 to close the water solenoid valve 86, thereby terminating the application of water onto the rotating brushes 30L, 30R.

Thereafter, the controller again, at 510, determines whether it is time to extend the brushes 30L, 30R. Since the three second duration of the tire coating fluid spray cycle is the same as the brush extension cycle, the controller 70, at 524, provides signals on output lines 116, 118 to open the extend solenoid valve 112 and close the retract solenoid valve 114. That operation permits pressurized air to pass through the solenoid valve 112 to the cylinders 64L, 64R, thereby extending the cylinders and the rotating brushes 30L, 30R into the path of the oncoming tires 28 of the vehicle 24. The controller 70, at 518, determines whether the water timer has expired and if the control is operating in the greaterthan-five minutes cycle as detected at 504. If so, the controller, at 520, sets a coating timer within the controller 70 to three seconds and further provides a control signal on output line 110 to open the coating solenoid valve 102, at 522. Opening the coating solenoid valve causes the coating fluid to be sprayed in a fan spray from the left and right coating fluid nozzles 108L, 108R onto the respective rotating brushes 30L, 30R. After three seconds, the controller 70, at 526, detects the coating timer has expired and, at 528, provides a control signal over output line 110 to close the coating solenoid valve 102, thereby terminating the spray of the coating fluid from the left and right nozzles 108L, 108R onto the respective brushes 30L, 30R. At the end of the three second coating spray, the rotating brushes 30L, 30R are fully wetted with the tire coating fluid and in an optimum state to apply the coating fluid to the tires 28L, 28R.

Referring to FIG. 1, as the brushes 30L, 30R reach their fully extended positions, bumpers 122L, 122R simultaneously contact respective tires 28L, 28R. There is sufficient give in the air/oil cylinders 64L, 64R that the forces of the tires 28L, 28R against their respective bumpers 122L, 122R are able to move the rotating brushes 30L, 30R backward until the brushes 30L, 30R slide across the outer surfaces 31L, 31R of the tires 28L, 28R. The brushes 30L, 30R are approximately eight feet long and therefore, remain in contact with the respective tires 28L, 28R during at least one full revolution of those tires, thereby applying a consistent coating of the tire coating fluid thereto.

It should be noted that with the coating machine 22L adjacent the conveyor 26, the location of the left-side tire 28L can accurately be determined for every vehicle. However, vehicles vary greatly in their width, and therefore, the right side coating machine 22R must have a greater stroke in order to guarantee that the rotating brush 30R always contacts the tire 28R. In order to accommodate the wide range of locations of the right tire 28R, the right side extension arms 44R are substantially longer than the left side extension arms 44L. After the brushes 30L, 30R have coated the two front tires, they often lose contact with the tires 28L, 28R; and with wider vehicles, the pressure on the cylinder 64R causes the right-side brush 30R to move outward beneath the frame of the vehicle. In order to limit that motion, a locking valve 130 is connected in the air supply line between the solenoids 112, 114 and the right cylinder 64R. Further, after the tires 28L, 28R are in contact with the brushes 30L, 30R, for example, three seconds after the controller 70 receives a coating cycle start signal on line 78, the controller 70 provides a signal over output line 132 to close the locking valve 130. The closed locking valve 130 permits only limited motion of the right-side brush 30R; and thus, after the brush 30R loses contact with the front tire, its outward motion beneath the frame of the vehicle is limited. After the brush 30R is in contact with the rear tire or at a later time, the controller 70 provides a signal over output line 132 to open the locking valve 130, thereby permitting the cylinder 64R to follow the operation of the solenoids 112,114.

The conveyor controller 72 provides, on output line 76, a signal representing the length of the vehicle 24. Thus, the coating controller 70 is able to determine when the rear tires of the vehicle are moved by the conveyor 26 past the rotating brushes 30L, 30R. When the controller 70 at 530 determines that the end of the vehicle has passed the brushes 30L, 30R, the controller, at 532, applies a control signal on output line 119 to terminate the operation of the hydraulic power supply 120, thereby stopping the rotation of the brushes 30L, 30R. In addition, the controller 70 provides signals on output lines 116, 118 to close the extend solenoid valve 112 and open the retract solenoid valve 114. That operation permits pressurized air to pass through the solenoid valve 114 to the cylinders 64L, 64R, thereby retracting the cylinders and the rotating brushes 64L, 64R away from the tires 28 of the vehicle 24.

As will be appreciated, the ability to reliably apply a consistent, high quality coating to the tires is dependent on many factors. One important factor is the wetted condition of the rotating brushes 30L, 30R. If a number of vehicles are being processed in rapid succession past the coating apparatus 22, the rotating brushes 30L, 30R remain in a saturated wetted condition between coating cycles. Another condition that effects the ability of the coating apparatus to reliably apply a consistent coating is the wetted state of the tires when they initially contact the rotating brushes 30L, 30R. In some vehicle washing establishments, the vehicle is dried with high temperature, high velocity air that is blown over the vehicle. This very effective drying action also substantially dries the tires prior to their contact with the rotating brushes 30L, 30R. Through experimentation, it has been determined that if the tires are dryer and if the time between cycles is less than five minutes, it is appropriate to reduce the amount of water and coating fluid applied to the rotating brushes 30L, 30R between coating cycles. Therefore, if the coating controller 70, at 504, detects that it has been less than five minutes since the last coating cycle, the controller, at 534, sets the water timer to three seconds. Similarly, at 518, upon detecting the lessthan-five-minutes cycle, the controller 70 sets the coating timer, at 536, to two seconds. As will be appreciated, since it requires three seconds to extend the brushes, when operating in this less-than-five-minute cycle, the controller 70, at 510, determines that the brushes must start extending with one second remaining in the water wetting cycle. Therefore, after the two second coating wetting cycle, the rotating brushes 30L, 30R will be fully extended.

In other vehicle washing establishments, the drying operation may be less effective because it is conducted with unheated air or, for other reasons, the tires have more water on them when they initially contact the wetted brushes. As will be appreciated, the wetting cycles of the water and coating fluid are adjusted accordingly. With a wetter tire, the controller 70 is programmed to determine, at 504, 518, whether it has been more than ten minutes since the last coating cycle. If so, the water timer and coating timers are set to four seconds and three seconds, respectively, as previously described with respect to FIG. 5. However, if the controller 70 detects, at 504, 518, that the time since the last coating cycle is less than ten minutes, the water timer is set to zero, at 534, and the coating timer, at 536, is set to two seconds. As will be appreciated, in this mode of operation, upon a vehicle being in position as detected, at 502, the controller 70 detects, at 510, that the brushes must immediately be extended which is effected by opening the extension solenoid valve and closing the retraction solenoid valve at 524. One second later, the controller 70 then, at 536, sets the coating timer to two seconds and opens the coating solenoid valve at 522. Thus, the coating wetting cycle will end simultaneously with the rotating brushes 30L, 30R reaching their fully extending position.

Over a period of time, the coating apparatus 22 applies the coating fluid to a large number of tires, and the condition of the brushes 30L, 30R is periodically visually inspected. Although the tires 28L, 28R are normally washed prior to being coated, the brushes 30L, 30R will pick up some dirt. When it is desired to clean the brushes 30L, 30R, the operator manually adds a quantity of soap to the water source 82. Next the operator depresses a clean push button 126 (FIG. 4) which provides a start clean cycle signal on input 128 of the coating controller 70.

As will be appreciated, the brush cleaning cycle can be initiated at any time, and the brushes 30L, 30R may or may not be rotating. Referring to FIG. 5, upon the controller 70 detecting, at 502, a brush cleaning cycle, the controller, at 503, initiates the operation of the brush motors 42L, 42R and also sets a brush cleaning cycle flag within the controller 70. Therefore, this makes sure that the brushes are rotating. Further, the brush cleaning cycle is also detected, at 538; and at 540, the controller 70 sets a cleaning timer within the controller to three minutes and provides a control signal on output line 88 to open the water solenoid valve 86. The water reservoir has previously been filled with soap or another cleaning agent, and therefore, the pump 80 initially pumps a cleaning agent onto the rotating brushes 30L, 30R. However, the water reservoir 82 is a one gallon reservoir, and the water pump 80 provides water to the nozzles 90L, 9OR at a rate of approximately 7 gallons per minute. Thus, over a three minute period, 21 gallons of water will be applied to the brushes 30L, 30R. The initial application of fluid from the reservoir 82 will have the strongest concentration of cleaning fluid, whereas subsequent applications of fluid from the reservoir will have lesser concentrations of the cleaning fluid. After 21 refills of the reservoir 82, the fluid being applied to the brushes 30L, 3OR should be clean water, thereby thoroughly rinsing the brushes 30L, 30R.

When the controller 70 detects the expiration of the cleaning timer, at 542, it then sets a pause timer, at 544, to one minute. Upon detecting, at 546, the expiration of the pause timer, the controller 70, at 548, sets the coating timer to ten seconds and provides a on signal output line 110 to open the coating solenoid valve 102. Thereafter, the controller, at 526, detects the expiration of the coating timer and closes the coating solenoid valve, at 528. Further, the controller 70 also looks at the state of the cleaning cycle flag, and if it is set, the controller 70 resets the flag, thereby indicating the end of the cleaning cycle. Upon detecting the end of a cleaning cycle, at 530, the controller then provides a control signal over output line 119 to shut off the hydraulic power supply 120, thereby stopping the rotation of the now clean brushes 30L, 30R.

The tire coating apparatus 20 automatically applies a consistent, high quality coating to the tires of a vehicle, thereby producing coated tires that are very pleasing in appearance. Further, the coating provides some protection for the tires against the harmful effects of to ultraviolet light. The tire coating apparatus 20 is especially useful in combination with facilities that have automatic vehicle cleaning machines. The coating apparatus 20 has the advantages of utilizing minimal floor space, requiring no manual labor and providing a consistent coating in a minimal amount of time. Thus, the tire coating apparatus 20 is efficient and economical to install and use.

While the invention has been set forth by a description of the described embodiment in considerable detail, it is not intended to restrict or in any way limit the claims to such detail. Additional advantages and modifications will readily appear to those who are skilled in the art. For example, in the described embodiment, the nozzles 90, 108 are positioned immediately over one another. Further, the water nozzles 90 are positioned over the coating fluid nozzles 108 so that the coating spray is further removed from ambient air turbulence. Any turbulence that deflects the coating spray away from the brushes 30 is a waste of the coating fluid and obviously, should be avoided. However, in other constructions, the coating fluid nozzles 108 may be placed over the water nozzles 90. As will be appreciated, the nozzles can be positioned in many different configurations with respect to each other, and any configuration that properly wets the brush will work.

Although, the brushes 30L, 30R are described as rotating clockwise and counterclockwise, respectively, when looking toward a front end of an approaching vehicle, opposite rotations may be employed. Further, the brush cleaning cycle is described as being manually initiated, as will be appreciated, an automatic brush cleaning cycle may be initiated at different times. In addition, any soap required may be automatically injected into the water source 82 by means of a solenoid operated by the controller 70.

Several examples of different coating cycles have been described in detail. However, the choice of wetting times for the water and coating fluid wetting cycles is application dependent and will vary depending the time between coating cycles, how wet the tires are when they reach the coating apparatus as well as other factors, some of which have discussed herein. Further, while water is described as being the first brush conditioning wetting fluid, other fluids may be used that are compatible with the tire coating that is being used. In addition, while a water based silicone solution is described as being the coating fluid, as will be appreciated, other silicone-type fluids may be used, for example, a petroleum based silicone solution, a polymer solution, etc.

The described embodiment utilizes spray nozzles to wet the rotating brush prior to a tire coating cycle. As will be appreciated, other wetting mechanisms may be used. For example, the manifolds or paths for the first and second fluids may be directed into a fluid manifold centrally located within and extending the length of the shaft 34. Further holes in the wall of that manifold can be used to direct the first and second fluids to the rotating brush.

Further, while the brush is described as an active, rotating brush, as will be appreciated, the brush 30 motion may be oscillatory, circular or some other pattern while transferring the second coating fluid to the tire. Alternatively, the brush 30 may be a passive, still brush, for example, a foam pad-type of brush, that is simply pushed into contact with the tire, and the coating fluid is then transferred to the rotating tire as it rolls by the passive, still brush pad. As will be appreciated, with this embodiment, the nozzles would have to be located to properly wet the brush.

Therefore, the invention in its broadest aspects is not limited to the specific detail shown and described. Consequently, departures may be made from the details described herein without departing from the spirit and scope of the claims which follow.

What is claimed is:

1. A tire coating apparatus for applying a coating to a tire of a vehicle comprising:
   a brush;
   a positioner supporting the brush for selectively moving the brush into contact with the tire;
   a first fluid path adapted to be connectable to a source of a first fluid and directing the first fluid onto a portion of the brush when the first fluid path and the first fluid source are connected; and
   a second fluid path adapted to be connectable to a source of a second fluid and directing the second fluid onto substantially the portion of the brush when the second fluid path and the second fluid source are connected, the first and second fluids saturating substantially the portion of the brush, the positioner moving the brush into contact with the tire and the brush transferring at least the second fluid to the tire.

2. The tire coating apparatus of claim 1 wherein the first fluid path comprises a fluid line connected to the source of the first fluid and terminating with a first nozzle.

3. The tire coating apparatus of claim 2 wherein the second fluid path comprises a fluid line connected to the source of the second fluid and terminating with a second nozzle.

4. The tire coating apparatus of claim 3 wherein the first and second nozzles provide a spray pattern.

5. The tire coating apparatus of claim 4 wherein the first and second nozzles provide a fan spray pattern of approximately 110°.

6. The tire coating apparatus of claim 3 wherein the brush is a rotating brush.

7. The tire coating apparatus of claim 6 further comprising a plurality of first nozzles approximately equally spaced over a length of the rotating brush.

8. The tire coating apparatus of claim 7 further comprising a plurality of second nozzles approximately equally spaced over the length of the rotating brush.

9. The tire coating apparatus of claim 8 wherein each of the plurality of first nozzles is located immediately adjacent one of the plurality of second nozzles.

10. The tire coating apparatus of claim 9 wherein the first fluid is water and the second fluid is a coating fluid and the first nozzles have a flowrate of approximately 0.5 gallons per minute and the second nozzles have a flowrate of approximately 0.1 gallons per minute .

11. The tire coating apparatus of claim 10 wherein the coating fluid is a silicone-type fluid.

12. The tire coating apparatus of claim 1 further comprising:
- first and second electrically operated valves in the respective first and second fluid paths; and
- a control electrically connected to the first and second valves for operating the valves to control the flow of the first and second fluids through the first and second fluid paths, respectively.

13. The tire coating apparatus of claim 1 wherein the brush is made of an absorbent and durable material.

14. The tire coating apparatus of claim 1 wherein the brush is made of a polyester material.

15. The tire coating apparatus of claim 6 wherein the rotating brush is made of an absorbent, durable material secured tightly wound in a tight spiral on the rotating brush.

16. A tire coating apparatus for applying a coating to a tire of a vehicle comprising:
- a brush;
- a positioner supporting the brush for selectively moving the brush into contact with the tire;
- a first valve connectable to a source of first fluid;
- a second valve connectable to a source of a tire coating fluid; and
- a controller electrically connected to the positioner and the first and second valves, the controller
  connecting the first valve with the first fluid to direct the first fluid onto the brush,
  thereafter connecting the second valve with the tire coating fluid source to direct the tire coating fluid onto the brush, and
  causing the positioner to move the brush into contact with the tire, thereby transferring at least the second fluid to the tire.

17. The tire coating apparatus of claim 16 further comprising:
- a first nozzle fluidly coupled to the first valve for directing the first fluid onto the brush; and
- a second nozzle fluidly coupled to the second valve for directing the tire coating fluid onto the brush.

18. The tire coating apparatus of claim 17 further comprising the first nozzle directing the first fluid onto a portion of the brush and the second nozzle directing the tire coating fluid onto substantially the portion of the brush.

19. A tire coating apparatus for applying a coating to tires of a moving vehicle comprising:
- a brush:
- a source of first fluid;
- a first nozzle mounted adjacent the brush, the first nozzle directing a first fluid onto a portion of the brush when supplied with the first fluid;
- a source of tire coating fluid;
- a second nozzle mounted adjacent the brush, the second nozzle directing a tire coating fluid onto substantially the portion of the brush when supplied with the tire coating fluid; and
- a positioner supporting the brush and the first and second nozzles, the positioner moving the brush into contact with the tires of the moving vehicle and the brush transferring at least the tire coating fluid to the tires as the moving vehicle moves past the brush.

20. The tire coating apparatus of claim 19 wherein the tire coating fluid is a silicone-type fluid that dries when on the rotating brush, thereby causing the rotating brush be become stiff.

21. The tire coating apparatus of claim 20 wherein the first fluid is water that softens the rotating brush which has dried silicone-type fluid thereon.

22. The tire coating apparatus of claim 20 wherein the brush is a rotating cylindrical brush.

23. The tire coating apparatus of claim 20 wherein the first fluid is water and the second fluid is a silicone solution.

* * * * *

UNITED STATES PATENT AND TRADEMARK OFFICE
CERTIFICATE OF CORRECTION

PATENT NO.    : 6,260,225 B1                                    Page 1 of 1
DATED         : July 17, 2001
INVENTOR(S)   : Bradford K. Bowman It is certified that error appears in the above-identified patent and that said Letters Patent is hereby corrected as shown below:

Column 2,
Line 67, reads "it is understood at all of the parts" and should read -- it is understood that all of the parts --.

Column 3,
Line 26, reads "the water wetting cycle used" and should read -- the water wetting cycle is used --.
Line 58, reads "water nozzles 90 have a flow of 0.5 gallons per minute, and the coating fluid nozzles 108 have a flow of 0.1 gallons per minute are used." and should read -- water nozzles 90 having a flow of 0.5 gallons per minute, and the coating fluid nozzles 108 having a flow of 0.1 gallons per minute are used. --.
Line 62, reads "rushes" and should read -- brushes --.

Column 4,
Line 34, reads "ivotally" and should read -- pivotally --.
Line 35, reads "oves" and should read -- moves --.

Column 11,
Line 15, reads "made of an absorbent, durable material secured tightly wound in a tight spiral on the rotating brush" and should read -- made of an absorbent, durable material secured to, and tightly wound in a tight spiral on, the rotating brush --.

Column 12,
Line 10, reads "a brush:" and should read -- a brush; --.
Line 29, reads "brush be become" and should read -- brush to become --.

Signed and Sealed this

Eighteenth Day of June, 2002

*Attest:*

JAMES E. ROGAN
*Attesting Officer*      *Director of the United States Patent and Trademark Office*

UNITED STATES PATENT AND TRADEMARK OFFICE
CERTIFICATE OF CORRECTION

PATENT NO. : 6,260,225 B1
DATED : July 17, 2001
INVENTOR(S) : Bradford K. Bowman It is certified that error appears in the above-identified patent and that said Letters Patent is hereby corrected as shown below:

Column 2,
Line 67, reads "it is understood at all of the parts" and should read -- it is understood that all of the parts --.

Column 3,
Line 26, reads "the water wetting cycle used" and should read -- the water wetting cycle is used --.
Line 58, reads "water nozzles 90 have a flow of 0.5 gallons per minute, and the coating fluid nozzles 108 have a flow of 0.1 gallons per minute are used." and should read -- water nozzles 90 having a flow of 0.5 gallons per minute, and the coating fluid nozzles 108 having a flow of 0.1 gallons per minute are used. --.
Line 62, reads "rushes" and should read -- brushes --.

Column 4,
Line 34, reads "ivotally" and should read -- pivotally --.
Line 35, reads "oves" and should read -- moves --.

Column 6,
Line 35, reads "greaterthan-five minutes" and should read -- greater-than-five-minutes --.

Column 7,
Line 63, reads "lessthan-five-minutes" and should read -- less-than-five-minutes --.

Column 8,
Line 62, reads "3OR" and should read -- 30R --.

Column 9,
Line 1, reads "and provides a on signal output" and should read -- and provides a signal on output --.
Line 16, reads "effects of to ultraviolet" and should read -- effects of ultraviolet --.
Line 54, reads "depending the time" and should read -- depending upon the time --.
Line 56, reads "some of which have discussed" and should read -- some of which have been discussed --.

UNITED STATES PATENT AND TRADEMARK OFFICE
CERTIFICATE OF CORRECTION

PATENT NO.   : 6,260,225 B1
DATED        : July 17, 2001
INVENTOR(S)  : Bradford K. Bowman It is certified that error appears in the above-identified patent and that said Letters Patent is hereby corrected as shown below:

Column 11,
Line 15, reads "made of an absorbent, durable material secured tightly wound in a tight spiral on the rotating brush" and should read -- made of an absorbent, durable material secured to, and tightly wound in a tight spiral on, the rotating brush --.

Column 12,
Line 10, reads "a brush:" and should read -- a brush; --.
Line 29, reads "brush be become" and should read -- brush to become --.

This certificate supersedes Certificate of Correction issued June 18, 2002.

Signed and Sealed this

Tenth Day of September, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.    : 6,260,225 B1
DATED         : July 17, 2001
INVENTOR(S)   : Bradford K. Bowman It is certified that error appears in the above-identified patent and that said Letters Patent is hereby corrected as shown below:

Column 2,
Line 67, reads "it is understood at all of the parts" and should read -- it is understood that all of the parts --.

Column 3,
Line 26, reads "the water wetting cycle used" and should read -- the water wetting cycle is used --.
Line 58, reads "water nozzles 90 have a flow of 0.5 gallons per minute, and the coating fluid nozzles 108 have a flow of 0.1 gallons per minute are used." and should read -- water nozzles 90 having a flow of 0.5 gallons per minute, and the coating fluid nozzles 108 having a flow of 0.1 gallons per minute are used. --.
Line 62, reads "rushes" and should read -- brushes --.

Column 4,
Line 34, reads "ivotally" and should read -- pivotally --.
Line 35, reads "oves" and should read -- moves --.

Column 6,
Line 35, reads "greaterthan-five minutes" and should read -- greater-than-five-minutes --.

Column 7,
Line 63, reads "lessthan-five-minutes" and should read -- less-than-five-minutes --.

Column 8,
Line 62, reads "3OR" and should read -- 30R --.

Column 9,
Line 1, reads "and provides a on signal output" and should read -- and provides a signal on output --.
Line 16, reads "effects of to ultraviolet" and should read -- effects of ultraviolet --.
Line 54, reads "depending the time" and should read -- depending upon the time --.
Line 56, reads "some of which have discussed" and should read -- some of which have been discussed --.

UNITED STATES PATENT AND TRADEMARK OFFICE
CERTIFICATE OF CORRECTION

PATENT NO. : 6,260,225 B1
DATED : July 17, 2001
INVENTOR(S) : Bradford K. Bowman It is certified that error appears in the above-identified patent and that said Letters Patent is hereby corrected as shown below:

Column 11,
Line 15, reads "made of an absorbent, durable material secured tightly wound in a tight spiral on the rotating brush" and should read -- made of an absorbent, durable material secured to, and tightly wound in a tight spiral on, the rotating brush --.

Column 12,
Line 10, reads "a brush:" and should read -- a brush; --.
Line 29, reads "brush be become" and should read -- brush to become --.

This certificate supersedes Certificate of Correction issued June 18, 2002.

Signed and Sealed this

Fifteenth Day of October, 2002

Attest:

Attesting Officer

JAMES E. ROGAN
Director of the United States Patent and Trademark Office